July 4, 1950  G. I. WAHNISH  2,513,606
CHUCK ADJUSTING DEVICE
Filed April 21, 1949
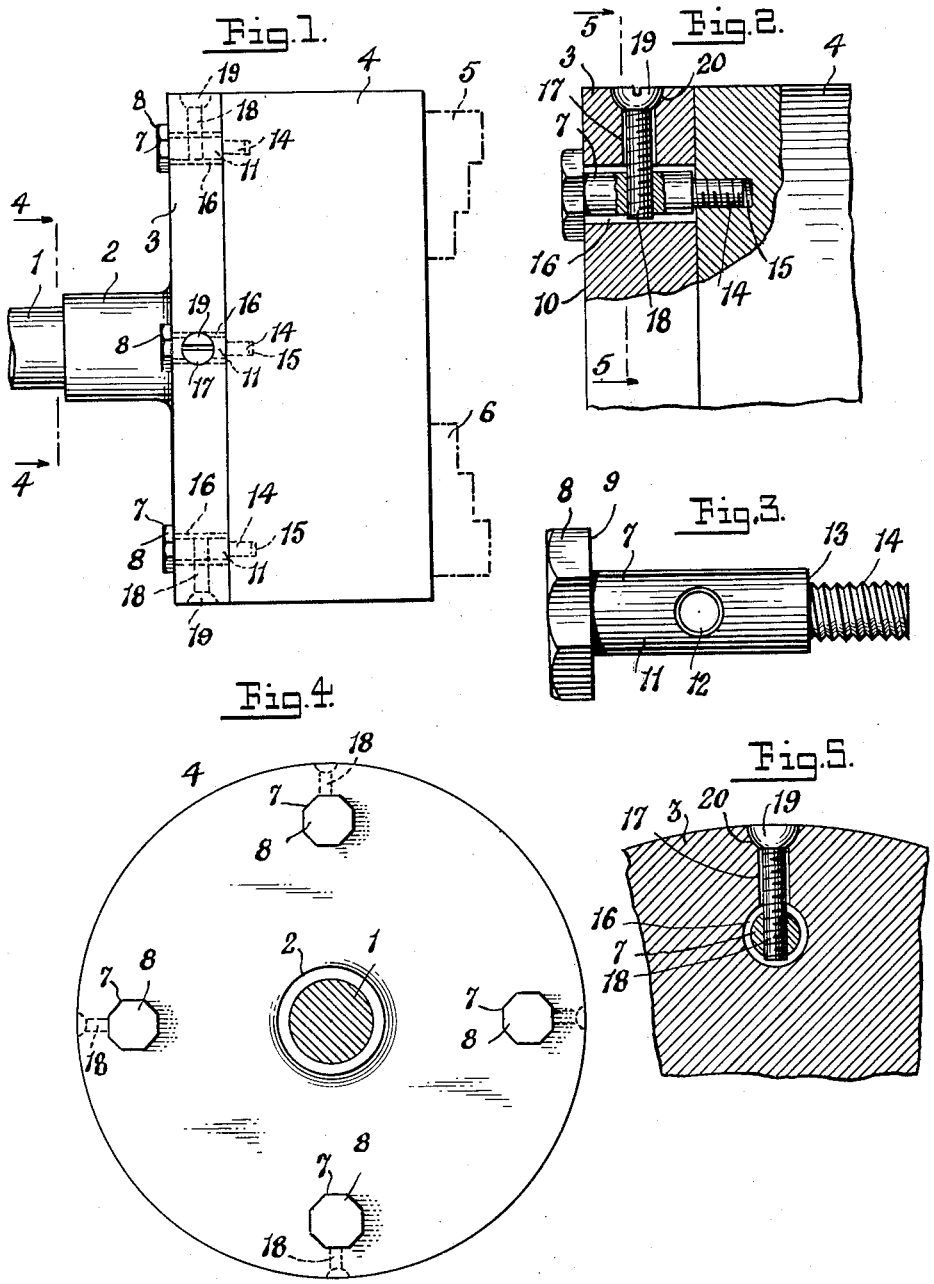
INVENTOR.
George I. Wahnish
BY
Harry Radzinsky
Attorney Patented July 4, 1950

2,513,606

UNITED STATES PATENT OFFICE 2,513,606

CHUCK ADJUSTING DEVICE

George I. Wahnish, Venice, Calif.

Application April 21, 1949, Serial No. 88,735

5 Claims. (Cl. 279—6)

This invention relates to machine tools and particularly to means by which a chuck or similar tool or rotating tool holder is made adjustable to thereby maintain its concentricity with relation to the rotative shaft on which it is mounted.

In many tools of this kind, and with special reference to lathes and drill presses, accurate positioning of the chuck is very often not obtained so that precision work is impossible. This is particularly true of tools of less expensive construction.

The primary object therefore, of the present invention, is to provide means by which an adjustment may be made by which the chuck may be accurately and easily adjusted to its proper concentric position on the base member on which it is mounted, thereby insuring precise work.

More particularly, the invention contemplates the provision of a base member, which may be in the form of a plate or disk and against which the chuck is mounted; of fastening means passing through the base member and entering the chuck to hold the same against the base member, said fastening means passing through oversize openings in the base member, permitting lateral shifting movement of said fastening means; and of adjusting elements in threadable engagement with the fastening means to thereby permit of shifting movement of the same and the chuck to which said fastening means are secured.

The invention contemplates the provision of other means and the attainment of other objects to be herein set forth and more particularly pointed out in the claims appended hereto.

In the accompanying drawing, wherein an illustrative embodiment of the invention is disclosed, Fig. 1 is a side elevation of a chuck and mounting therefor, showing the improved adjusting means for the chuck; Fig. 2 is a sectional view of a portion of the chuck and mounting-plate, showing one of the adjusting devices; Fig. 3 is a side elevation of one of the fastening screws; Fig. 4 is a sectional view, taken on the line 4—4 of Fig. 1, looking in the direction of the arrows, and Fig. 5 is a sectional view taken on the line 5—5 of Fig. 2, looking in the direction of the arrows.

Referring to the drawing, 1 indicates a rotated spindle or shaft of a machine tool, which may be a lathe, a drill-press or other machine having a rotating part adapted to receive and hold a chuck. Secured on the shaft 1 is a chuck mounting-plate, which in the form shown is provided with a boss 2, which is internally threaded for reception upon the threaded end of the spindle 1. The chuck mounting-plate 3, on which the boss 2 is formed, is in the shape of a disk, and the chuck 4 may be of conventional form, and is provided with jaws 5 or other gripping elements of known construction, and is held against the outer face of the plate 3 by means of screws or similar fastening elements 7 of the construction shown in Fig. 3.

Each of the screws 7 extends through an opening 16 extending completely through the plate 3, four of these openings, in equally-spaced relationship, being shown. This number of openings 16 may be decreased or increased if found desirable. Each of the openings 16 is considerably larger in diameter than the smooth shank portion 11 with which the screw 7 is provided, thus permitting lateral shifting movement or adjustment of each screw 7 within its opening 16 in a manner to be described.

At one end, the screw 7 is formed with a relatively large head 8 which may be square, hexagon or octagon or slotted for screw-driver manipulation if desired. The head 8 is made relatively large so that regardless of the lateral shift or adjustment of the screw within its aperture 16, the shoulder 9, formed by the inner face of the head 8 will uniformly bear against the face 10 of the plate 3 around the opening 16. At its opposite end, the screw 16 is formed with a threaded shank portion 14 adapted to be threadably received in a threaded recess 15 formed in the chuck 4. At the junction of the threaded portion 14 and the smooth part 11 of the screw is provided an annular shoulder 13 clearly disclosed in Fig. 3.

Extending transversely through the smooth shank portion 11 of each of the screws 7 is a threaded aperture 12 adapted to threadably receive a threaded adjusting screw 18. The shank of each of said adjusting screws 18 extends through an oversize opening 17 formed in the plate 3. One end of each of said openings is located at the periphery of the plate 3 where it is formed with a hemispherical seat 20 receiving the half-round head 19 on the screw 18. The opposite end of each aperture 17 is in communication with one of the openings 16. It will thus be noted that from each of the openings 16 is extended to the periphery of the disk 3 an aperture 17, the axis of the latter being at right angles to the axis of the opening 16 from which it extends.

From the foregoing, the operation of the improved adjusting device will be readily understood. The chuck 4 is held securely against the forward face of the plate 3 by the screws 7, the threaded portions 14 thereof being received in the threaded recesses 15 formed in the rear end of the chuck. When the screws 7 are firmly screwed in place, the transverse apertures 12 therethrough will each register with one of the apertures 17 so that a screw 18, entered through each of the apertures 17 can threadably engage one of the apertures 12.

By means of the adjusting screws 18 it will be apparent that the chuck can be slightly shifted to an extent required to locate the axis of the chuck to coincide exactly with the axis of the shaft 1 and thus secure precision workmanship. In making the adjustment, three of the fastening screws 7 and adjustment screws 18 therefor are sufficiently loosened to enable the remaining screw 7, which need not be loosened, to be shifted to the extent desired by manipulation of its adjusting screw 18 as needed to accurately center the chuck. Since the adjusting means is provided at the four points of securement of the chuck to the plate 3, it will be apparent that the chuck may be shifted in any direction required by operation of the several adjustment screws to secure precise and accurate positioning of the chuck relative to the plate 3 and the axis of the rotating shaft 1.

It will be observed that clearance is provided in the apertures 17 for the adjusting screws 18, and this coupled with the half-round heads on these screws, permits a slight tilting movement of these screws, or either of them, should such tilting movement be required by adjustment of one or the other of the screws. The openings 16 are also relatively large as compared to the shank portions 11 of the screws 7 which extend through these openings. Hence, a shifting movement of the screws 7, under adjustment by the screws 18, and thus suitable movement of the chuck 4 to which the screws 18 are attached, can take place.

While I have herein described the improved adjusting means as applied to a chuck-holding device for lathes, drill-presses and similar tools, it will be apparent that this construction may well be embodied in other tools or machines wherein a chuck or other tool-holding element is employed and in which a precise concentricity of the said element with respect to its driving shaft is desired. Therefore, when herein referring to a lathe or drill-press, I wish to be understood as comprehending within these terms any machine in which a chuck or other tool-holding element is held and needs adjustment to insure its concentricity, and in which the disclosed construction can be used to advantage.

Having described one embodiment of the invention, it is obvious that the same is not to be restricted thereto, but is broad enough to cover all structures coming within the scope of the annexed claims.

What I claim is:

1. An adjusting device of the character described, comprising, a rotating spindle, a plate secured to the same, a chuck held against the face of said plate, the plate being provided with a plurality of apertures, fastening screws extending through said apertures and threadably engaging the chuck to maintain the same against the face of the plate, the apertures being of a size to permit of lateral shifting movement of the fastening screws, adjusting screws extending through the plate at an angle to the fastening screws and in threadable engagement with said fastening screws, and means in the plate for allowing an angular tilt of the adjusting screws.

2. In an adjusting device of the character described, a rotating shaft, a disk attached to the same, a chuck maintained against a face of the disk, fastening screws extending through the plate from the rear thereof and entering the chuck and attaching said chuck to the disk, the disk being provided with apertures through which the fastening screws extend, said apertures being of greater diameter than the fastening screws to allow said screws to have lateral shifting movement within said apertures, adjusting screws extending inwardly into the disk from the periphery of the disk and engaging the fastening screws, said adjusting screws being mounted to have tilting movement in the disk.

3. In an adjusting device of the character described, a mounting disk for a chuck, a chuck held against the face of the disk, the disk having a plurality of apertures extending through it, fastening screws passing through said apertures and entering the chuck, threaded recesses in the chuck for receiving the ends of said fastening screws, the apertures in the disk through which the fastening screws extend being larger in diameter than the shanks of the screws to permit of lateral shift of said screws in said apertures, each screw being provided with a transversely extending threaded aperture, adjusting screws extending inwardly from the edge of the disk and in threadable engagement with the threaded apertures in the fastening screws, said adjusting screws being capable of tilting movement in the disk.

4. In an adjusting device as provided for in claim 3, including passages extending from each of the apertures in the disk to the periphery of the disk, the adjusting screws extending through said passages and being of smaller diameter than said passages to allow of possible tilting movement of each of said adjusting screws in the passage through which it passes.

5. In an adjusting device of the character described, a disk, a chuck held against the same, a fastening screw extending through the disk and threadably engaging the chuck, an adjusting screw disposed at an angle to the fastening screw and threadably entering the fastening screw, the adjusting screw being capable of tilting movement in the disk.

GEORGE I. WAHNISH.

REFERENCES CITED

The following references are of record in the file of this patent:

UNITED STATES PATENTS

| Number | Name | Date |
|---|---|---|
| 76,380 | Baldwin | Apr. 7, 1868 |
| 2,435,396 | Koch | Feb. 3, 1948 |
| 2,472,040 | Brookfield | May 31, 1949 |

FOREIGN PATENTS

| Number | Country | Date |
|---|---|---|
| 60,084 | Austria | Feb. 15, 1913 |